Nov. 14, 1944.   B. STECHBART   2,362,676
CENTRIFUGALLY CONTROLLED GOVERNOR DEVICE
Filed June 29, 1943
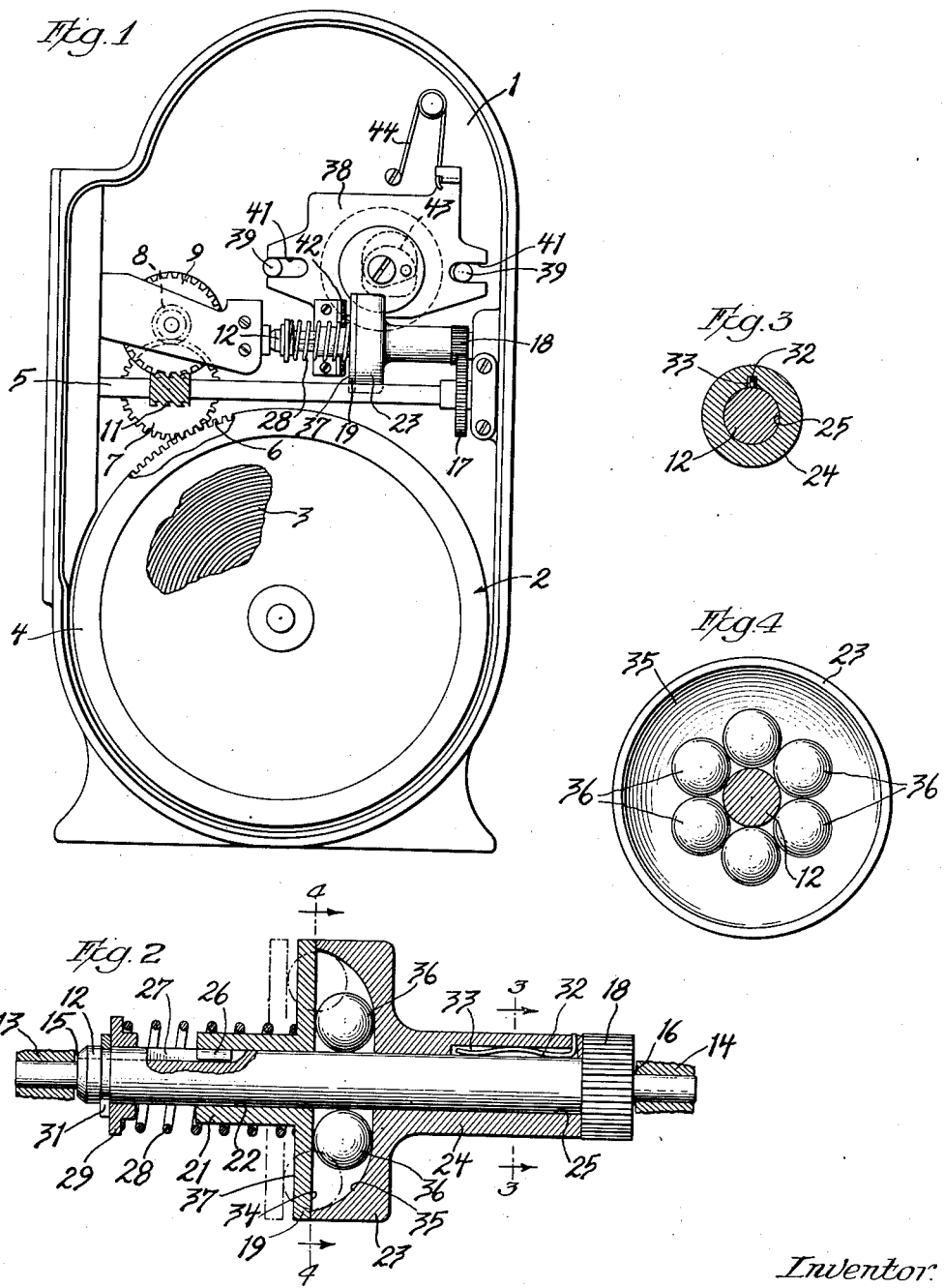
Inventor
Bruno Stechbart Patented Nov. 14, 1944

2,362,676

UNITED STATES PATENT OFFICE 2,362,676

CENTRIFUGALLY CONTROLLED GOVERNOR DEVICE

Bruno Stechbart, Park Ridge, Ill., assignor to The Bell & Howell Company, Chicago, Ill., a corporation of Illinois Application June 29, 1943, Serial No. 492,719

1 Claim. (Cl. 188—187)

My invention relates particularly to centrifugal speed governors such as are used in maintaining a constant operating speed of spring driven mechanisms.

The general object of the invention resides in the provision of a novel, effective and accurate centrifugally controlled friction device which is particularly adapted for maintaining uniform operating speed of spring driven motion picture cameras, having in view compactness and desirable adjustment for different controlled speeds.

The invention will be better understood by reference to the accompanying drawing in which—

Figure 1 is a side elevational view of a motion picture camera embodying a centrifugal governor of my invention with parts omitted and parts broken away;

Figure 2 is an enlarged axial sectional view of the rotor assembly of the governor;

Figure 3 is a section on the line 3—3 of Figure 2; and

Figure 4 is a sectional view on the line 4—4 of Figure 2.

Referring to the drawing, a motion picture camera casing is designated at 1, and mounted within the casing is a spring motor, generally designated at 2, which includes a power spring 3 contained within a rotatably mounted casing 4 and operative thereon to rotate the same in a usual manner. See Figure 1. Power is transmitted from the spring motor to a rotatably mounted transmission shaft 5, connected with the camera mechanism, not shown, to drive the same, by means of a multiplying gear train consisting of a primary drive spur gear 6 on the motor casing 4, a rotatably mounted spur gear 7 meshing with the gear 6, a rotatably mounted spur gear pinion 8 meshing with the gear 7, a spiral gear 9 fixed with the pinion 8 to rotate therewith, and a spiral gear pinion 11 fixed on the shaft 5 and meshing with the gear 9.

A governor shaft 12 is rotatably mounted in spaced bearings 13 and 14 and oppositely facing shoulders 15 and 16 on the shaft respectively engage the bearings 13 and 14 to confine this shaft axially. See particularly Figure 2. A spur gear 17 is secured on the shaft 5 and meshes with a spur pinion 18 formed on the shaft 12 to drive the shaft 12 from the spring motor 2.

A governor member 19 is provided with an axial hub 21 and an axial bore 22, and a second governor member 23 is provided with an axial hub 24 and an axial bore 25, and the governor shaft 12 is engaged in the bores of these governor members and thereby carries them for coaxial rotation.

The governor member 19 is slidable axially on the shaft 12 and is slidably keyed thereto, so that the shaft positively drives this governor member, by means of a key 26 fixed on this governor member and slidably engaging a longitudinal keyway 27 of the shaft. A coiled compression spring 28 encircles the shaft 12 and the hub 21 of the governor member 19 and, reacting on a collar 29 axially fixed on the shaft, as designated at 31, and, engaging the governor member 19, yieldably urges this governor member axially in the direction toward the governor member 23.

The governor member 23 is disposed on the shaft 12 between the governor member 19 and the gear pinion 18 and the hub 24 of the governor member 23 engages axially against the gear pinion 18 to provide a thrust bearing operative axially between this shaft and the governor member 23 and preventing axial movement of the governor member 23 in the direction in which the governor member 19 is urged by the spring 28. A bow spring 32, engaged in a longitudinal slot 33 of the governor member 23 at the bore 25 thereof, is compressed between this governor member and the shaft 12 radially thereof and forms a frictional drive means operative between this governor member and shaft.

The governor member 19 is provided with an axially facing surface of revolution 34 of the axis of the members 19 and 23 which surface faces in the direction in which this governor member is yieldably urged by the spring 28 and which as shown is flat. The governor member 23 is provided with an axially facing surface of revolution 35 of the axis of the members 19 and 23 which surface opposes the surface 34 and which as shown is of concave curvature, these surfaces converging outwardly from the axis of the governor members. A plurality of spherical centrifugal weight members 36 are arranged angularly about the axis of the governor members and are rotatable therewith and are engaged between the surfaces 34 and 35 and are movable radially of the axis of the governor members.

As the governor members 19 and 23 and the weight members 36 are rotated at sufficient speed, the weight members move outwardly from the axis of rotation under the influence of centrifugal force and, being engaged between the surfaces 34 and 35 converging outwardly from the axis of rotation, exert force varying with the speed of rotation on the governor member 29 to actuate it axially against the influence of the spring 28 toward the position shown in dot and dash lines in Figure 2. The spring 28 actuates the governor member 29 axially in the opposite direction and the weight members inwardly toward the axis of rotation toward the position shown in full lines in Figure 2 as the centrifugal force of the weight members decreases due to decrease in the speed of rotation.

The governor member 19 is provided with a second axially facing surface of revolution 37 of the axis of the members 19 and 23 which surface faces in the direction opposite that in which this member is axially urged by the spring 28, this surface 37 thus facing in the direction opposite that in which the surface 34 faces. A bracket 38 is mounted for movement parallel to the shaft 12 and consequently to axial movement of the governor member 19 by means of spaced stationary studs 39 slidably engaged in slots 41 on the bracket. A friction brake member 42, with respect to which the governor member 19 is rotatable, is mounted on the bracket 38 and is engageable by the surface 37 of this governor member to provide a friction brake for controlling the speed of this governor member and the mechanism driven therewith. The bracket 38 and with it the brake member 42 are adjustably positioned axially of the governor member 19 to vary the controlled speed thereof by means of a manually adjustable cam 43 operative on the bracket in one direction and a spring 44 operative on the bracket in the opposite direction.

As the governor member 19 is moved axially against the influence of the spring 28 by the weight members 36 under the influence of centrifugal force, as hereinbefore described, the surface 37 of the member 19 engages against the brake member 42, and as the governor member 19 is moved axially in the opposite direction by the spring 28, the surface 37 of the member 19 disengages from the brake member 42, so that the weight members 36 and spring 28 coact in controlling the braking pressure between the brake member 42 and the surface 37 to maintain a uniform speed of the governor member 19 and the mechanism driven thereby.

The concave curvature of the surface 35 of the governor member 23 provides a convergence of the surfaces 34 and 35 increasing in increment outwardly from the axis of the governor members 19 and 23, so that the radial range of movement of the weight members 36 and resulting variation of centrifugal force thereon is desirably limited without sacrificing effective and accurate speed control and without rendering adjustment of the brake member 42 for different controlled speeds over-critical or unduly non-uniform, particularly with reference to the different standardized speeds at which motion picture apparatus is operated.

While I have thus described my invention, I do not wish to be limited to the precise details described, as changes may be readily made without departing from the spirit of my invention, but having thus described my invention, I claim as new and desire to secure by Letters Patent the following:

In a device of the character described, the combination of two bored rotatable members, a rotatable driving shaft engaged in the bores of said rotatable members and thereby carrying said rotatable members for coaxial rotation, a first of said rotatable members being slidably keyed on said shaft for axial movement relative to the second of said rotatable members, a coiled compression spring encircling said shaft and reacting thereon and yieldably urging said first member axially relative to said second member, a bearing operative axially between said shaft and said second member and preventing axial movement of said second member in the direction in which said first member is urged, frictional drive means operative between said shaft and said second member, each of said rotatable members being provided with one of two opposing axially facing surfaces of revolution of and converging in increasing increment outwardly from the axis of said rotatable members and of which the surface of said first member faces in the direction in which this member is urged, said first member being provided with a second axially facing surface of revolution of said axis facing in the direction opposite that in which this member is urged, a plurality of spherical centrifugal weight members arranged angularly about said axis and rotatable with said rotatable members and engaged between said opposing surfaces and movable radially of said axis, and a friction member with respect to which said first member is rotatable and engageable by said second surface.

BRUNO STECHBART.